(12) United States Patent
Witt et al.

(10) Patent No.: US 10,953,345 B2
(45) Date of Patent: Mar. 23, 2021

(54) HPLC SAMPLE INTRODUCTION WITH BYPASS CHANNEL

(71) Applicant: AGILENT TECHNOLOGIES, INC., Loveland, CO (US)

(72) Inventors: Klaus Witt, Keltern (DE); Konstantin Shoykhet, Karlsruhe (DE); Dwight Stoll, Waldbronn (DE)

(73) Assignee: Agilent Technologies, Inc., Santa Clara, CA (US)

( * ) Notice: Subject to any disclaimer, the term of this patent is extended or adjusted under 35 U.S.C. 154(b) by 1124 days.

(21) Appl. No.: 14/252,711

(22) Filed: Apr. 14, 2014

(65) Prior Publication Data
US 2014/0366739 A1 Dec. 18, 2014

Related U.S. Application Data

(60) Provisional application No. 61/834,883, filed on Jun. 14, 2013.

(51) Int. Cl.
*B01D 15/14* (2006.01)
*G01N 30/20* (2006.01)
*G01N 30/46* (2006.01)

(52) U.S. Cl.
CPC ............ *B01D 15/14* (2013.01); *G01N 30/20* (2013.01); *G01N 30/463* (2013.01); *G01N 2030/202* (2013.01); *G01N 2030/204* (2013.01); *G01N 2030/208* (2013.01)

(58) Field of Classification Search
None
See application file for complete search history.

(56) References Cited

U.S. PATENT DOCUMENTS

| 4,982,597 A | 1/1991 | Berger |
| 6,576,125 B2 | 6/2003 | Berger et al. |
| 2012/0132013 A1* | 5/2012 | Glatz .................... G01N 30/20 73/863.02 |

FOREIGN PATENT DOCUMENTS

| EP | 309596 A1 | 4/1989 |
| EP | 1577012 A1 | 9/2005 |
| EP | 2703808 A1 | 3/2014 |
| JP | 2010101875 A | 5/2010 |
| WO | WO0250531 A2 | 6/2002 |

OTHER PUBLICATIONS

Machine translation of JP 2010101875 by Yoshiteru.*

* cited by examiner

*Primary Examiner* — Kara M Peo

(57) ABSTRACT

A sample dispatcher is disclosed and is configured for individually introducing a plurality of portions of one or more sample fluids into a flow of a mobile phase of a liquid separation system. The liquid separation system is configured for separating compounds of the sample fluids and comprises a mobile phase drive configured for driving the mobile phase through a separation unit configured for separating compounds of the sample fluids in the mobile phase. The sample dispatcher comprises one or more sample reservoirs, each configured for receiving and temporarily storing a respective sample fluid portion or at least a part thereof, and a bypass channel.

14 Claims, 9 Drawing Sheets

HPLC SAMPLE INTRODUCTION WITH BYPASS CHANNEL

CROSS-REFERENCE TO RELATED APPLICATIONS

The present application claims priority under 35 U.S.C. § 119(e) from commonly owned U.S. Provisional Application No. 61/834,883 filed on Jun. 14, 2013 to Witt, et al. The entire disclosure of U.S. Provisional Application No. 61/834,883 is specifically incorporated herein by reference.

BACKGROUND

The present invention relates to sample introduction and management, in particular in a high performance liquid chromatography application such as one-dimensional or two-dimensional HPLC.

In high performance liquid chromatography (HPLC), a liquid has to be provided usually at a very controlled flow rate (e.g. in the range of microliters to milliliters per minute) and at high pressure (typically 20-100 MPa, 200-1000 bar, and beyond up to currently 200 MPa, 2000 bar) at which compressibility of the liquid becomes noticeable. For liquid separation in an HPLC system, a mobile phase comprising a sample fluid (e.g. a chemical or biological mixture) with compounds to be separated is driven through a stationary phase (such as a chromatographic column packing), thus separating different compounds of the sample fluid which may then be identified. The term compound, as used herein, shall cover compounds which might comprise one or more different components.

The mobile phase, for example a solvent, is pumped under high pressure typically through a chromatographic column containing packing medium (also referred to as packing material or stationary phase). As the sample is carried through the column by the liquid flow, the different compounds, each one having a different affinity to the packing medium, move through the column at different speeds. Those compounds having greater affinity for the stationary phase move more slowly through the column than those having less affinity, and this speed differential results in the compounds being separated from one another as they pass through the column. The stationary phase is subject to a mechanical force generated in particular by a hydraulic pump that pumps the mobile phase usually from an upstream connection of the column to a downstream connection of the column. As a result of flow, depending on the physical properties of the stationary phase and the mobile phase, a relatively high pressure drop is generated across the column.

The mobile phase with the separated compounds exits the column and passes through a detector, which registers and/or identifies the molecules, for example by spectrophotometric absorbance measurements. A two-dimensional plot of the detector measurements against elution time or volume, known as a chromatogram, may be made, and from the chromatogram the compounds may be identified. For each compound, the chromatogram displays a separate curve feature also designated as a "peak". Efficient separation of the compounds by the column is advantageous because it provides for measurements yielding well defined peaks having sharp maxima inflection points and narrow base widths, allowing excellent resolution and reliable identification and quantitation of the mixture constituents. Broad peaks, caused by poor column performance, so called "Internal Band Broadening" or poor system performance, so called "External Band Broadening" are undesirable as they may allow minor components of the mixture to be masked by major components and go unidentified.

Two-dimensional separation of a fluidic sample denotes a separation technique in which a first separation procedure in a first separation unit is performed to separate a fluidic sample into a plurality of fractions, and in which a subsequent second separation procedure in a second separation unit is performed to further separate the plurality of fractions into sub-fractions. Two-dimensional liquid chromatography (2D LC) may combine two liquid chromatography separation techniques. When performing a 2D LC measurement, operation of two pumps needs to be coordinated in itself and with the action of further system components managing the sample and fraction transport, for instance with correspondingly switching fluidic valves. The sample and fraction pathway switching may result in pressure ripples or dips acting on separation units and other components of the liquid separation system, thereby deteriorating the chromatographic performance, reliability of the system and longevity of its components.

In so-called Comprehensive 2D LC, all eluate coming from the first dimension (e.g. the entire solvent flow containing the sample components past separation in the first chromatographic column) is coupled into the second dimension and further separated there. This significantly increases the requirements for processing speed in the second dimension. Typically, the solvent flow (containing the sample components) is fed into the second dimension in portions (also referred to as "sniplets"). Cycle times for processing of a single sniplet can be as fast as 15 seconds or lower. In such case with 4 cycles per minute, 24 hours of continued work means 5760 modulations or sample injections, which may come close to the lifetime of a column under usual operation conditions. In a number of arrangements the first dimension, or generally a sniplet source, provides sample contained in a solvent which may be too strong for the downstream dimension (e.g. for the second dimension). This can occur, e.g., when using HILIC (hydrophilic interaction liquid chromatography) in first dimension and RP (reversed phase) chromatography in second dimension, so it may be of advantage to dilute the sample plug (sniplet) coming from the collection loop before it hits the column.

Columns can be sensitive to flow disruptions and e.g. to reconnections with sample loops which hold lower pressure than the column itself (flow reversal due to backwards de-compression of the column content). Also the column may be sensitive to abrupt (re)connection to high pressure sources, resulting in pressure shocks on the column and packing material deterioration. These can be substantial factors of column aging, wear and deterioration.

SUMMARY

It is an object of the invention to provide an improved sample introduction, in particular for one- and two-dimensional HPLC applications.

According to an embodiment of the present invention, a sample dispatcher is configured for individually introducing a plurality of portions of one or more sample fluids into a flow path and thus into a flow of a mobile phase of a liquid separation system. The liquid separation system is configured for separating compounds of the sample fluid(s) and comprises a mobile phase drive configured for driving the mobile phase through a separation unit, whereby the separation unit is configured for separating compounds contained in the sample fluid(s) as those are driven through the separation unit by the mobile phase. The sample dispatcher comprises one or more sample reservoirs (preferably a first and a second sample reservoir), each configured for individually receiving and temporarily storing a respective portion of sample fluid or a part (or components) thereof. Such sample reservoir may be any kind of volume allowing to receive and temporarily store the respective sample fluid portion, such as a container, sample loop, capillary tube, injection needle, microfluidic device, planar fluidic device, cartridge, packed cartridge, trap column, etc. The sample dispatcher further comprises a bypass channel and is configured for selectively coupling at least one of the one or more sample reservoirs between the mobile phase drive and the separation unit.

The sample dispatcher may also work as and/or be referred to as a flow dispatching apparatus or a sample introduction apparatus.

According to one aspect of the invention, the sample dispatcher is further configured for coupling—during a dilution state—the bypass channel in parallel to the at least one of the one or more sample reservoirs and between the mobile phase drive and the separation unit. The dilution state of the sample dispatcher thus allows dilution of the respective sample fluid portion with the mobile phase.

By coupling the bypass channel—during the dilution state—in parallel to the respective sample reservoir (which is coupled between the mobile phase drive and the separation unit in order to transfer its respective content of the sample fluid portion into the separation unit), the volume of the mobile phase which flows during the dilution state through the bypass channel dilutes the sample fluid portion as the latter is joined with the mobile phase flow at the downstream joining point of said parallel connection. It is clear that the degree (or ratio) of dilution can be controlled e.g. by the flow ratio through the sample reservoir and through the bypass channel, and by the length of the time period of the dilution state, however, of course only as long as sample fluid is still at least partially contained in the sample reservoir during the dilution state.

Such dilution—during a dilution state—can be in particular of advantage e.g. in case the respective sample fluid portion to be separated contains a solvent which may influence the separation in the separation unit. This may be the case e.g. in a 2D LC application, where the mobile phase of the first dimension may influence or deteriorate the separation in the second dimension, if the dimensions are not sufficiently orthogonal, e.g. in case the first dimension is HILIC or normal phase and the second dimension is reversed phase (in which case the eluate of the first dimension is a strong or eluotropic solvent for the second dimension). The same can be valid in case of RP-chromatography in both dimensions. In particular in case the first dimension is operated in a gradient mode (wherein the ratio between at least two different solvents is varied over the time), such interference might vary during the course of the gradient mode, e.g. when going from non-organic to organic solvents, or vice versa.

According to another aspect of the invention, the sample dispatcher is (further or as alternative to the previous aspect) configured for coupling the bypass channel between the mobile phase drive and the separation unit at least during an intermediate state of the sample dispatcher. In the intermediate state, neither of the at least one of the one or more sample reservoirs is coupled between the mobile phase drive and the separation unit. The bypass channel thus allows maintaining the pressure and flow applied by the mobile phase drive to the separation unit, and may help avoiding that the separation unit is temporarily disconnected from the mobile phase drive (e.g. when switching between the sample reservoirs). This may allow reducing or even avoiding pressure variations (e.g. pressure drops or ripples) reaching the separation unit. This can be of advantage because such pressure variations, especially abrupt pressure variations, may not only adversely affect separation as well as measurement accuracy and precision, but may even damage such separation unit (in particular in case a chromatographic column is applied therein).

Embodiments of the invention allow providing an improved sample introduction, in particular for one- and two-dimensional HPLC applications and other hyphenated technique application with high pressure separation technology in the downstream dimension such as, e.g., SPE-LC, continuous process control LC.

In one embodiment of the present invention, both of the aforementioned aspects, i.e. dilution and suppression of pressure pulse(s), are provided by the sample dispatcher, which renders such embodiment in particular useful for 2D LC applications, in particular in comprehensive mode when all or substantially all eluate coming from the first dimension is coupled into the second dimension and further separated there.

In one embodiment, the sample dispatcher is configured for having a sample reservoir state, wherein at least one of the one or more sample reservoirs is coupled between the mobile phase drive and the separation unit while the bypass channel is not coupled between the mobile phase drive and the separation unit. In other words, during the sample reservoir state, only the respective sample reservoir/s is/are coupled between the mobile phase drive and the separation unit, while the bypass channel is decoupled and is not connected in parallel thereto. This may allow e.g. controlling the degree of dilution so that dilution of the respective sample fluid portion only occurs during the dilution state but is avoided (if undesired) by switching to the respective sample reservoir states.

In one embodiment, the sample dispatcher provides at least one of a first sample reservoir state and a second sample reservoir state. During the first sample reservoir state, a first sample reservoir is coupled between the mobile phase drive and the separation unit while the bypass channel is not coupled between the mobile phase drive and the separation unit. Accordingly, during the second sample reservoir state, a second sample reservoir is coupled between the mobile phase drive and the separation unit while the bypass channel is not coupled between the mobile phase drive and the separation unit.

In one embodiment, the bypass channel is configured to have a significantly smaller volume than each of the one or more sample reservoirs, preferably about 50%, more preferably 10%, and still more preferably 1% or less of the volume of the biggest sample reservoir.

The bypass channel may be chosen or adjusted to allow a solvent flow in a desired ratio to the flow through a sample reservoir thus providing a desired degree of dilution during the dilution state.

In one embodiment, the bypass channel is configured to be exchangeable or adjustable in its flow restrictivity, so that a flow ratio between a flow through the respective sample reservoir(s) and a flow through the bypass channel (and thus a dilution ratio in such parallel connection) can be adjusted. The ratio of the flow restrictivity of the respective sample reservoir and the bypass channel determines the resulting flow ratio between the bypass channel and the respective sample reservoir(s) in parallel connection.

In one embodiment the sample dispatcher is configured so that—at any point in the time—at least one of the one or more sample reservoirs and the bypass channel, either alone or in a parallel combination with any of the reservoirs, is coupled between the mobile phase drive and the separation unit. This allows to maintain continuous pressure and flow supply from the mobile phase drive to the separation unit, and thus to reduce or even avoid pressure variations.

In one embodiment, the sample dispatcher receives the plurality of portions of one or more sample fluids and is configured for loading a respective sample fluid portion into (at least) one of the one or more sample reservoirs. The sample dispatcher may be operated to alternatingly load the at least one of the one or more sample reservoirs (preferably two sample reservoirs), so that at least one of the sample reservoirs can be loaded while the content of at least another one may be being transferred into the flow of the mobile phase.

In one embodiment, the at least one of the one or more sample reservoirs comprise a first sample reservoir configured for receiving and temporarily storing a first sample fluid portion or at least a part thereof, and a second sample reservoir configured for receiving and temporarily storing a second sample fluid portion or at least a part thereof. This can be useful as well in one-dimensional as in 2D LC applications. In an 2D LC application, this may allow to substantially continuously processing in the second dimension the eluate received from the first dimension by (substantially continuously) switching between loading one sample reservoir and introducing the content of the other sample reservoir into the flow of the mobile phase of the second dimension.

According to another aspect of the present invention, a liquid separation system is provided for separating sample fluid compounds. The liquid separation system comprises a first mobile phase drive, a sample providing apparatus, a first separation unit, and a sample dispatcher in accordance with any one of the aforementioned embodiments. The first mobile phase drive (which may be a pump or pumping system) is adapted to drive a first mobile phase through the liquid separation system. The sample providing apparatus is configured to provide a plurality of portions of one or more sample fluids. The first separation unit, which may be a chromatographic column, is adapted for separating compounds of the sample fluid in the first mobile phase as those are passed through the first separation unit.

The sample dispatcher is coupled to the first mobile phase drive and to the sample providing apparatus and is configured to introduce the provided sample fluid portions into a flow of the mobile phase. The sample dispatcher is further configured to load a respective sample fluid portion into at least one of the one or more sample reservoirs (and preferably serially and alternatingly into different ones of the sample reservoirs). In such a liquid separation system, the sample dispatcher receives the sample fluid from the sample providing apparatus, and may alternatingly fill at least one sample reservoir while the content of the other sample reservoir(s) is being transferred into the flow of the first mobile phase (which may then be separated by the first separation unit).

In one embodiment, the sample providing apparatus of the liquid separation system comprises a second mobile phase drive, which may also be a pump or pumping system and embodied in accordance with the first mobile phase drive, adapted to drive a second mobile phase through a second liquid separation system. A second separation unit, which may also be a chromatographic column in accordance with the first separation unit, is provided adapted for separating compounds of the sample fluid in the second mobile phase. At least a portion of the compounds past separation are provided as the plurality of portions of one or more sample fluids. Such embodiment may be in particular useful in 2D LC applications, so that the sample providing apparatus may represent an embodiment of the first dimension of a 2D-LC system.

One embodiment according to the present invention is related to a method of individually introducing a plurality of portions of one or more sample fluids into a flow of a mobile phase of a liquid separation system. The liquid separation system is configured for separating compounds of the sample fluids and comprises a mobile phase drive and a sample dispatcher. The mobile phase drive is configured for driving the mobile phase through a separation unit for separating compounds of the sample fluids in the mobile phase. The sample dispatcher comprises one or more sample reservoirs, each configured for receiving and temporarily storing a respective sample fluid portion or at least a part thereof, and a bypass channel. The method comprises selectively coupling at least one of the one or more sample reservoirs (e.g. a first sample reservoir and/or a second sample reservoir) between the mobile phase drive and the separation unit.

According to one aspect of the present invention, the method further comprises coupling—during a dilution state—the bypass channel in parallel to the at least one of the one or more sample reservoirs (e.g. either one of the first sample reservoir and the second sample reservoir) as well as between the mobile phase drive and the separation unit. During the dilution state of the sample dispatcher, the respective sample fluid portion can be diluted with the mobile phase provided through the bypass channel.

According to another aspect of the present invention, the method comprises (alternatively or in addition to the previous aspect) a step of coupling the bypass channel between the mobile phase drive and the separation unit at least during an intermediate state of the sample dispatcher. In such intermediate state, neither of the at least one of the one or more sample reservoirs is coupled between the mobile phase drive and the separation unit.

The embodiments of the present invention are preferably applied in Comprehensive 2D LC, wherein substantially all eluate coming from the first dimension (e.g. the entire solvent flow containing the sample components past separation in the first chromatographic column) is coupled into the second dimension and further separated there.

In embodiments, the sample dispatcher is configured to allow cycle times for processing of a single portion of sample fluid (also referred to as sniplet) in less than one minute, and preferably in 15 seconds or lower. Correspondingly, the sample dispatcher is configured to allow a frequency of sample portion introduction of more than one per minute (i.e. more than 16 mHz), and preferably one per 15 seconds (i.e. more than 60 mHz) and higher. This can be in particular obtained by reducing pressure variation in accordance to the aforedescribed embodiments.

Embodiments of the present invention might be embodied based on most conventionally available HPLC systems, such as the Agilent 1220, 1260 and 1290 Infinity LC Series or the Agilent 1100 HPLC series (all provided by the applicant Agilent Technologies-see www.agilent.com).

One embodiment of an HPLC system comprises a pumping apparatus having a piston for reciprocation in a pump working chamber to compress liquid in the pump working chamber to a high pressure at which compressibility of the liquid becomes noticeable.

One embodiment of an HPLC system comprises two pumping apparatuses coupled either in a serial or parallel manner. In the serial manner, as disclosed in EP 309596 A1, the disclosure of which is specifically incorporated by reference, an outlet of the first pumping apparatus is coupled to an inlet of the second pumping apparatus, and an outlet of the second pumping apparatus provides an outlet of the pump. In the parallel manner, an inlet of the first pumping apparatus is coupled to an inlet of the second pumping apparatus, and an outlet of the first pumping apparatus is coupled to an outlet of the second pumping apparatus, thus providing an outlet of the pump. In either case, a liquid outlet of the first pumping apparatus is phase shifted, preferably essentially by 180 degrees, with respect to a liquid outlet of the second pumping apparatus, so that only one pumping apparatus is supplying into the system while the other is intaking liquid (e.g. from the supply), thus allowing to provide a continuous flow at the output. However, it is clear that also both pumping apparatuses might be operated in parallel (i.e. concurrently), at least during certain transitional phases e.g. to provide a smooth(er) transition of the pumping cycles between the pumping apparatuses. The phase shifting might be varied in order to compensate pulsation in the flow of liquid as resulting from the compressibility of the liquid. It is also known to use three piston pumps having about 120 degrees phase shift. Also other types of pumps are known and operable in conjunction with the present invention.

The separating device preferably comprises a chromatographic column providing the stationary phase. The column might be a glass, metal, ceramic or a composite material tube (e.g. with a diameter from 50 μm to 5 mm and a length of 1 cm to 1 m) or a microfluidic column (as disclosed e.g. in EP 1577012 A1, the disclosure of which is specifically incorporated herein by reference, or the Agilent 1200 Series HPLC-Chip/MS System provided by the applicant Agilent Technologies. The individual components are retained by the stationary phase differently and separate from each other while they are propagating at different speeds through the column with the eluent. At the end of the column they elute at least partly separated from each other. During the entire chromatography process the eluent might be also collected in a series of fractions. The stationary phase or adsorbent in column chromatography usually is a solid material. The most common stationary phase for column chromatography is silica gel, followed by alumina. Cellulose powder has often been used in the past. Also possible are ion exchange chromatography, reversed-phase chromatography (RP), affinity chromatography or expanded bed adsorption (EBA). The stationary phases are usually finely ground powders or gels and/or are microporous for an increased surface, which can be especially chemically modified, though in EBA a fluidized bed is used.

The mobile phase (or eluent) can be either a pure solvent or a mixture of different solvents. It can also contain additives, i.e. be a solution of the said additives in a solvent or a mixture of solvents. It can be chosen e.g. to adjust the retention of the compounds of interest and/or the amount of mobile phase to run the chromatography. The mobile phase can also been chosen so that the different compounds can be separated effectively. The mobile phase might comprise an organic solvent like e.g. methanol or acetonitrile, often diluted with water. For gradient operation water and organic are delivered in separate containers, from which the gradient pump delivers a programmed blend to the system. Other commonly used solvents may be isopropanol, tetrahydrofuran (THF), hexane, ethanol and/or any combination thereof or any combination of these with aforementioned solvents.

The sample fluid might comprise any type of process liquid, natural sample like juice, body fluids like plasma or it may be the result of a reaction like from a fermentation broth.

The fluid is preferably a liquid but may also be or comprise a gas and/or a supercritical fluid (as e.g. used in supercritical fluid chromatography—SFC—as disclosed e.g. in U.S. Pat. No. 4,982,597 A, the disclosure of which is specifically incorporated herein by reference).

The pressure in the mobile phase might range from 2-200 MPa (20 to 2000 bar), in particular 10-150 MPa (100 to 1500 bar), and more particularly 50-120 MPa (500 to 1200 bar).

The HPLC system might further comprise a detector for detecting separated compounds of the sample fluid, a fractionating unit for outputting separated compounds of the sample fluid, or any combination thereof. Further details of HPLC system are disclosed with respect to the aforementioned Agilent HPLC series, provided by the applicant Agilent Technologies, under www.agilent.com.

Embodiments of the invention can be partly or entirely embodied or supported by one or more suitable software programs, which can be stored on or otherwise provided by any kind of data carrier, and which might be executed in or by any suitable data processing unit. Software programs or routines can be preferably applied in or by the control unit.

In the context of this application, the term "fluidic sample" may particularly denote any liquid and/or gaseous medium, optionally including also solid particles, which is to be analyzed. Such a fluidic sample may comprise a plurality of fractions of molecules or particles which shall be separated, for instance biomolecules such as proteins. Since separation of a fluidic sample into fractions involves a certain separation criterion (such as mass, volume, chemical properties, etc.) according to which a separation is carried out, each separated fraction may be further separated by another separation criterion (such as mass, volume, chemical properties, etc.), thereby splitting up or separating a separate fraction into a plurality of sub-fractions.

In the context of this application, the term "fraction" may particularly denote such a group of molecules or particles of a fluidic sample which have a certain property (such as mass, volume, chemical properties, etc.) in common according to which the separation has been carried out. However, molecules or particles relating to one fraction can still have some degree of heterogeneity, i.e. can be further separated in accordance with another separation criterion.

In the context of this application, the term "downstream" may particularly denote that a fluidic member located downstream compared to another fluidic member will only be brought in interaction with a fluidic sample or its components after interaction of those with the other fluidic member (hence being arranged upstream). Therefore, the terms "downstream" and "upstream" relate to a general flowing direction of the fluidic sample or its components, but do not necessarily imply a direct uninterrupted fluidic connection from the upstream to the downstream system parts.

In the context of this application, the term "sample separation apparatus" may particularly denote any apparatus which is capable of separating different fractions of a fluidic sample by applying a certain separation technique. Particularly, two separation units may be provided in such a sample separation apparatus when being configured for a two-dimensional separation. This means that the sample or any of its parts or subset(s) is first separated in accordance with a first separation criterion, and is subsequently separated in accordance with a second separation criterion, which may be the same or different.

The term "separation unit" may particularly denote a fluidic member through which a fluidic sample is guided and which is configured so that, upon conducting the fluidic sample through the separation unit, the fluidic sample or some of its components will be at least partially separated into different groups of molecules or particles (called fractions or sub-fractions, respectively) according to a certain selection criterion. An example for a separation unit is a liquid chromatography column which is capable of selectively retarding different fractions of the fluidic sample.

In the context of this application, the terms "fluid drive" or "mobile phase drive" may particularly denote any kind of pump or fluid flow source or supply which is configured for conducting a mobile phase and/or a fluidic sample along a fluidic path. A corresponding fluid supply system may be configured for metering two or more fluids in controlled proportions and for supplying a resultant mixture as a mobile phase. It is possible to provide a plurality of solvent supply lines, each fluidically connected with a respective reservoir containing a respective fluid, a proportioning appliance interposed between the solvent supply lines and the inlet of the fluid drive, the proportioning appliance configured for modulating solvent composition by sequentially coupling selected ones of the solvent supply lines with the inlet of the fluid drive, wherein the fluid drive is configured for taking in fluids from the selected solvent supply lines and for supplying a mixture of the fluids at its outlet. More particularly, one fluid drive can be configured to provide a mobile phase flow which drives or carries the fluidic sample through a respective separation unit, whereas another fluid drive can be configured to provide a further mobile phase flow which drives or carries the fluidic sample or its parts after treatment by respective separation unit, through a further separation unit.

BRIEF DESCRIPTION OF DRAWINGS

Other objects and many of the attendant advantages of embodiments of the present invention will be readily appreciated and become better understood by reference to the following more detailed description of embodiments in connection with the accompanying drawing(s). Features that are substantially or functionally equal or similar will be referred to by the same reference sign(s). The illustration in the drawing is schematic.

DETAILED DESCRIPTION

Figure 1:
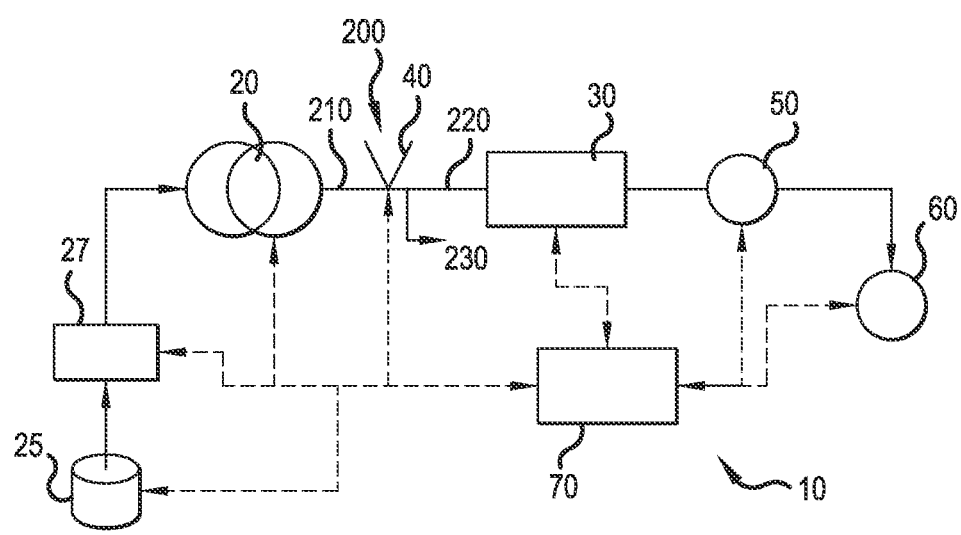
FIG. 1 shows a liquid separation system 10, in accordance with embodiments of the present invention, e.g. used in high performance liquid chromatography (HPLC).

Referring now in greater detail to the drawings, FIG. 1 depicts a general schematic of a liquid separation system 10. A pump 20 (sometimes referred to as "mobile phase drive") receives a mobile phase from a solvent supply 25, typically via a degasser 27, which degases the mobile phase and thus reduces the amount of dissolved gases in it. The pump 20—as a mobile phase drive—drives the mobile phase through a separation unit 30 (such as a chromatographic column, sometimes (referred to herein as a "column") comprising a stationary phase. A sample dispatcher 40 (also referred to as sample introduction apparatus) is provided between the pump 20 and the separation unit 30 in order to subject or add (often referred to as sample introduction) portions of one or more sample fluids into the flow of a mobile phase (denoted by reference numeral 200, see also FIG. 2). The stationary phase of the separation unit 30 is adapted for separating compounds of the sample fluid, e.g. a liquid. A detector 50 is provided for detecting separated compounds of the sample fluid. A fractionating unit 60 can be provided for outputting separated compounds of sample fluid.

While the mobile phase can be comprised of one solvent only, it may also be mixed of plurality of solvents. Such mixing might be a low pressure mixing and provided upstream of the pump 20, so that the pump 20 already receives and pumps the mixed solvents as the mobile phase. Alternatively, the pump 20 might be comprised of plural individual pumping units, with plural of the pumping units each receiving and pumping a different solvent or mixture, so that the mixing of the mobile phase (as received by the separation unit 30) occurs at high pressure and downstream of the pump 20 (or as part thereof). The composition (mixture) of the mobile phase may be kept constant over time, the so called isocratic mode, or varied over time, the so called gradient mode.

A data processing unit 70, which can be a conventional PC or workstation, might be coupled (as indicated by the dotted arrows) to one or more of the devices in the liquid separation system 10 in order to receive information and/or control operation. For example, the data processing unit 70 might control operation of the pump 20 (e.g. setting control parameters) and receive therefrom information regarding the actual working conditions (such as output pressure, flow rate, etc. at an outlet of the pump 20). The data processing unit 70 might also control operation of the solvent supply 25 (e.g. monitoring the level or amount of the solvent available) and/or the degasser 27 (e.g. setting control parameters such as vacuum level) and might receive therefrom information regarding the actual working conditions (such as solvent composition supplied over time, flow rate, vacuum level, etc.). The data processing unit 70 might further control operation of the sample dispatcher 40 (e.g. controlling sample introduction or synchronization of the sample introduction with operating conditions of the pump 20). The separation unit 30 might also be controlled by the data processing unit 70 (e.g. selecting a specific flow path or column, setting operation temperature, etc.), and send—in return—information (e.g. operating conditions) to the data processing unit 70. Accordingly, the detector 50 might be controlled by the data processing unit 70 (e.g. with respect to spectral or wavelength settings, setting time constants, start/stop data acquisition), and send information (e.g. about the detected sample compounds) to the data processing unit 70. The data processing unit 70 might also control operation of the fractionating unit 60 (e.g. in conjunction with data received from the detector 50) and provide data back. Finally the data processing unit might also process the data received from the system or its part and evaluate it in order to represent it in adequate form prepared for further interpretation.

Figure 2:
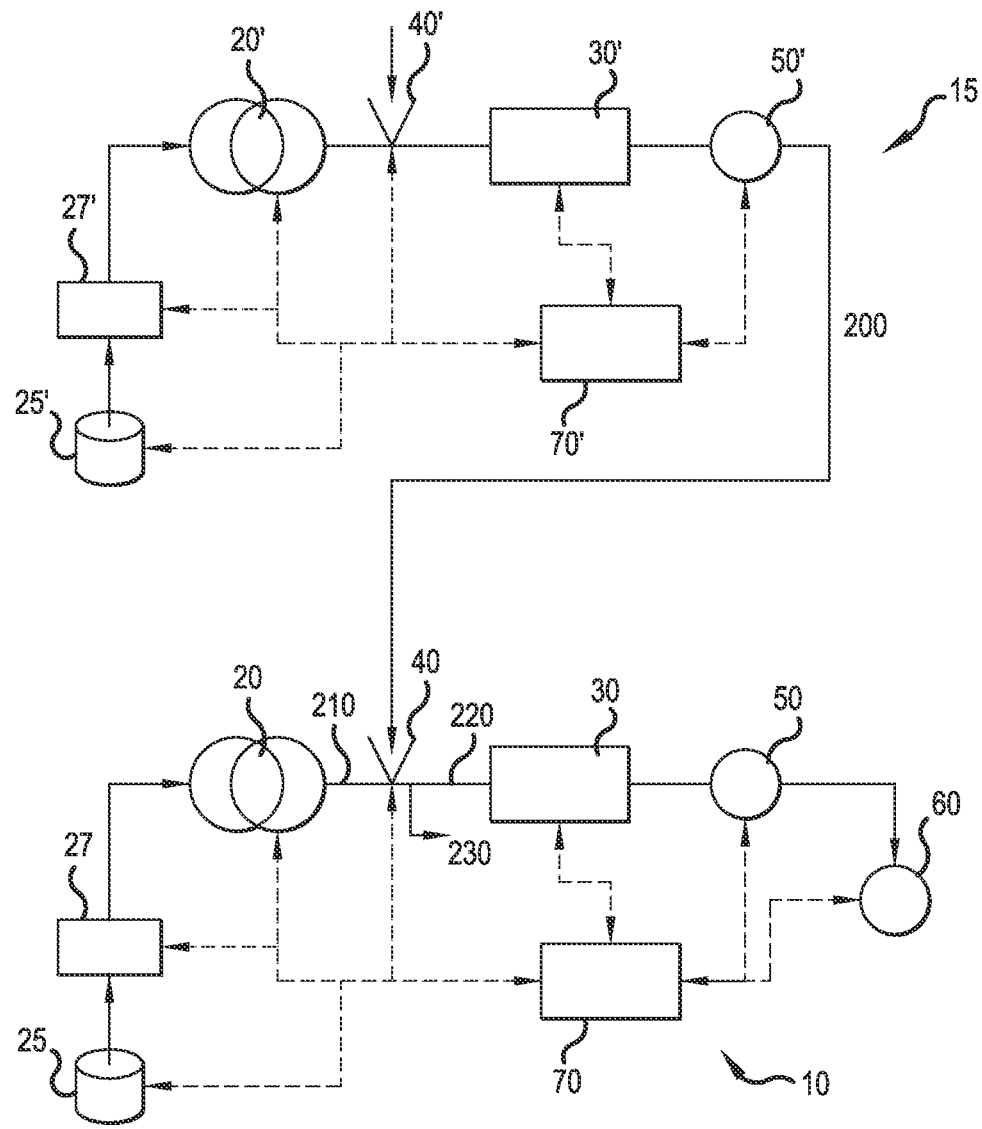
FIG. 2 shows an embodiment of the liquid separation system 10 as used in 2D LC.

FIG. 2 schematically shows an embodiment of the liquid separation system 10 in accordance with the embodiment of FIG. 1 but further provided to be used in two-dimensional chromatography (2D LC). In 2D LC systems, usually the individual separations are operated independently. This means that there is one LC arrangement, which has a column for first dimension separation, of which the outlet fluid, e.g. a liquid (or parts or portions thereof) may be transferred into the high pressure path of the second dimension upstream of its column. If the separation in the second dimension is a periodic process, the fluid should only be introduced periodically and in portions (rather than continuously) into the high pressure path of the second dimension. This may lead to some complex arrangements. On one hand the arrangement should park or temporarily store a certain amount of fluid coming from the first dimension column and on the other hand it should bring the respective fluid plug or sniplet (which might be a fraction with regard to the sample of the first dimension and is a sample with regard to the second dimension) to the second dimension column with minimum disturbance.

As apparent from the schematic representation of FIG. 2, the liquid separation system 10 for 2D LC here consists of two parts, each of those substantially representing the liquid separation system as depicted in FIG. 1. The features of the first dimension 15 (also referred to as separation subsystem) are denoted with ' and identical in function with the corresponding features of the second dimension (denoted without '), except for the sampling unit 40'. The sampling unit 40' may represent a sample dispatcher similar in function to the sample dispatcher 40 or it may represent any other embodiment of a sampling unit such as injection valve, manual injector, autosampler or alike. An output 200 from the second separation unit 30' (either provided directly or with an optional detector 50' coupling thereto) is output (at low pressure) and coupled to the sample dispatcher 40. The output 200, or at least a part thereof, of the first dimension thus provides the input of the sample dispatcher 40 and can be introduced or transferred (modulated) into the second dimension.

It is clear that the first dimension may be provided in a simpler form and with fewer components than shown in FIG. 2. E.g. the detector 50' can be omitted, and the data processing unit 70' might be the same as 70.

In both FIGS. 1 and 2, the flow path from the pump 20 to the sample dispatcher 40 shall be denoted as 210, the flow path from the sample dispatcher 40 to separating device shall be denoted as 220, and an additional flow path to waste shall be denoted as 230.

FIGS. 3A to 3E schematically show different sequential states of operation of the sample dispatcher 40. A full operation cycle may comprise a sequence of states 3 A to 3 F and subsequently 3E to 3A in the reversed sequence. Each of the states 3B to 3D can differ in function depending on the sequentially previous state, as will be explained further in detail.

The sample dispatcher 40 comprises a valve 300 (which might be embodied by any suitable valve or combination of valves, as known in the art), a first sample reservoir 310, a second sample reservoir 320, and a bypass channel 330. Each of the first and second sample reservoirs 310 and 320 is configured for receiving and temporarily storing a respective sample fluid portion as received by reference numeral 200.

The valve 300 in FIG. 3 is schematically represented here as a shift valve for the sake of better understanding. Other embodiments in rotational valves are described later with respect to FIGS. 4 and 5.

Figure 3A:
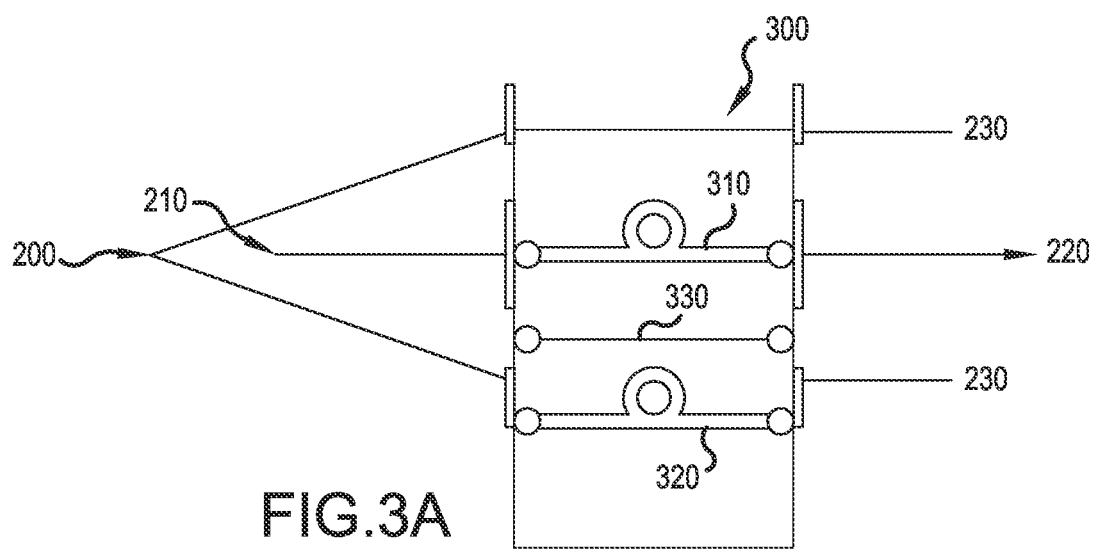
FIGS. 3A to 3E schematically show different states of operation of the sample dispatcher 40.

The different states of operation of the valve 300 and thus the different modes or phases of operation of the sample dispatcher 40 shall be explained in the following. FIG. 3A shall represent a (starting) state wherein the first sample reservoir 310 is coupled between lines 210 and 220, i.e. between the pump 20 and the column 30, so that the content of the first sample reservoir 310 can be provided (also referred to as injected or introduced) into the flow path (and thus into the flow of the mobile phase) and will be moved downstream to the column 30 for separation. The mobile phase from the line 200 is provided via the first sample reservoir 310 and the line 220 to a separation unit 30 to facilitate the separation. The second sample reservoir 320 is coupled to line 200 and may thus be filled (or loaded) with a new sample fluid portion. The other side of the second sample reservoir 320 is connected to waste 230. The bypass channel 330 in this state is not coupled to any of the lines and therefore is without function in this state of FIG. 3A.

Figure 3B:
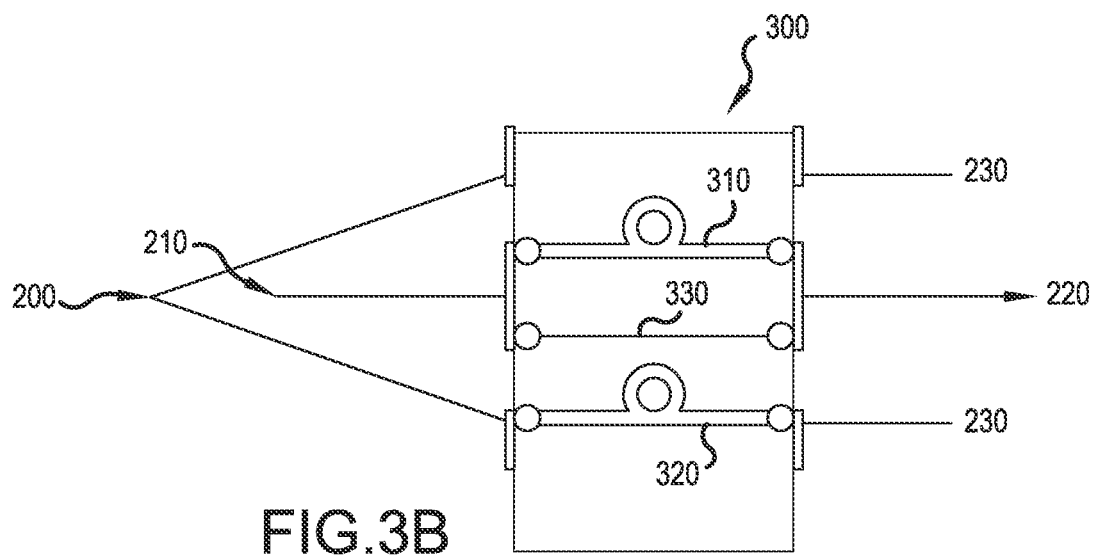

FIG. 3B shows an intermediate switching state following after the state shown in the FIG. 3A. In this state, the first sample reservoir 310 and the bypass channel are coupled between lines 210 and 220, i.e. coupled in parallel between the pump 20 and the column 30. The second sample reservoir 320 in FIG. 3B is being "filled" via line 200 in accordance as shown in FIG. 3A.

Figure 3C:
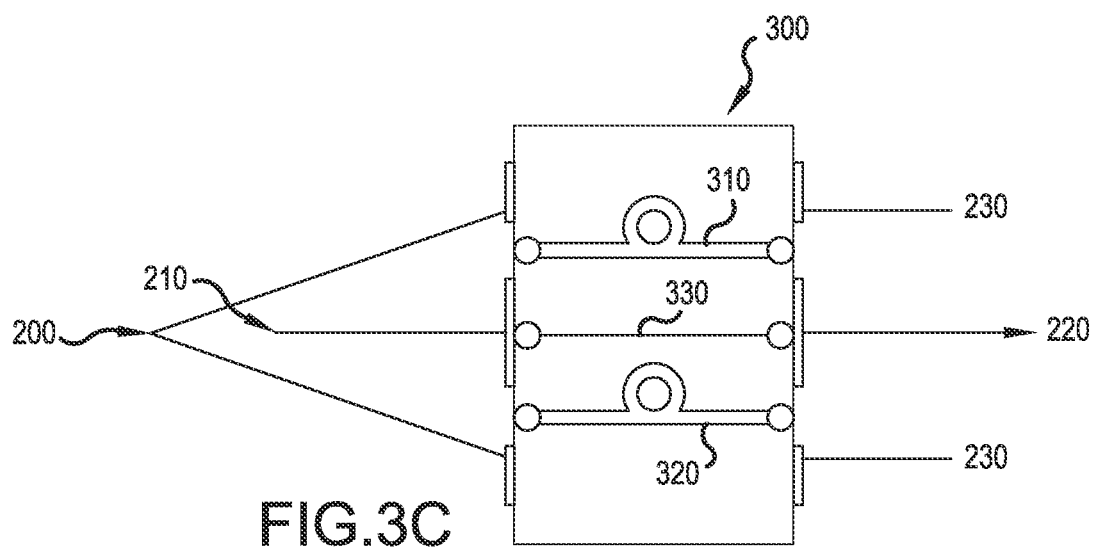

FIG. 3C shows an "intermediate state" following after the state shown in the FIG. 3B. In such intermediate state, neither the first sample reservoir 310 nor the second sample reservoir 320 is coupled between lines 210 and 220, i.e. coupled between the pump 20 and the column 30. In order to avoid (or at least reduce) a pressure variation (e.g. pressure drop) occurring at line 220 to the column 30 during such intermediate state, the bypass channel 330 is now coupled between lines 210 and 220 thus coupling the pump 20 via the bypass channel 330 to the column 30.

Figure 3D:
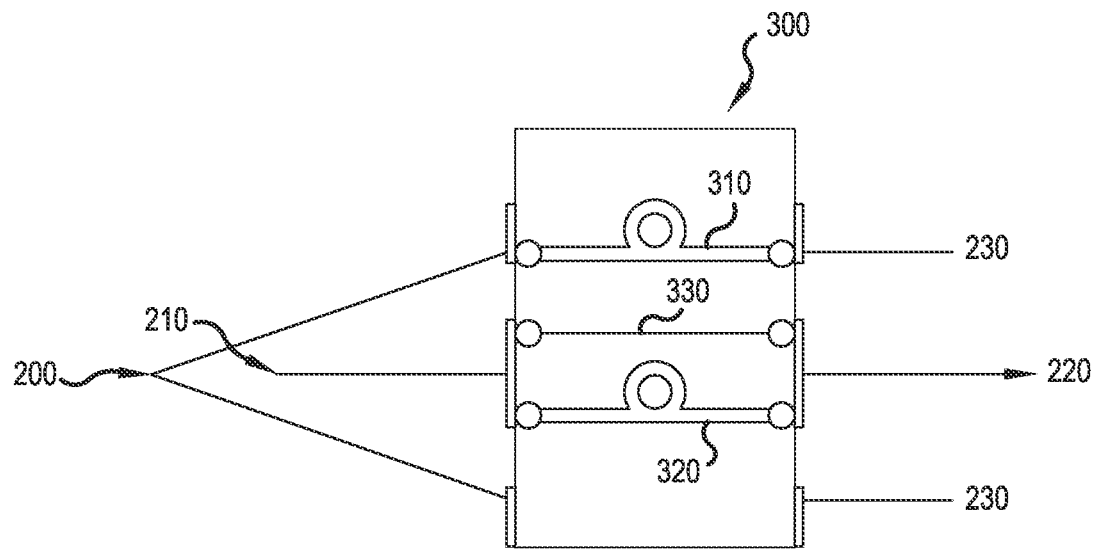

FIG. 3D shows a "dilution state" in respect to the second sample reservoir 320. In this dilution state, the second sample reservoir 320 and the bypass channel are coupled between lines 210 and 220, i.e. coupled in parallel between the pump 20 and the column 30, so that a portion of the mobile phase provided from the pump 20 passes through the second sample reservoir 320 and another portion passes through the bypass channel 330. Accordingly, the content of the second sample reservoir 320 (which is sample portion which has been filled in during the states of FIGS. 3A and B) will gradually be displaced into the line 220 and diluted by the mobile phase flown through the bypass channel 330 as both of the partial flows, via the second sample reservoir 320 and via the bypass channel 330 are joined, so that the content of the second sample reservoir 320 gets diluted (with respect to the state in FIG. 3A). This is in particular useful in the 2D LC application e.g. of FIG. 2, thus allowing to adapt and modify concentration of solvents to the respective application. The first sample reservoir 310 in FIG. 3D is being "filled" via line 200.

Figure 3E:
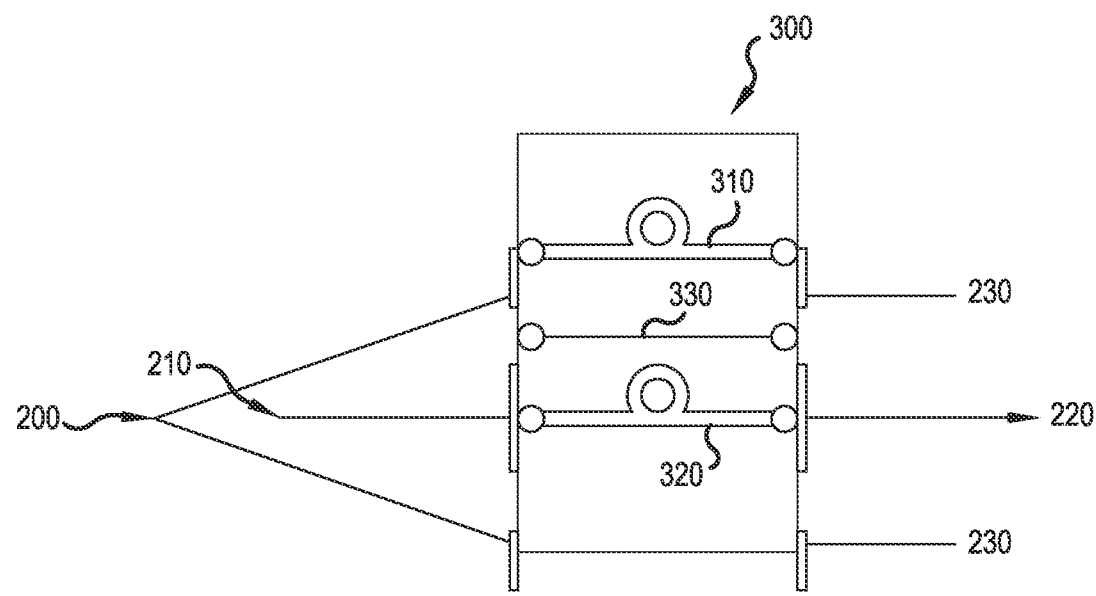

FIG. 3E shows a state which substantially symmetrically corresponds to the state of FIG. 3A with the difference that in FIG. 3E the second sample reservoir 320 is now coupled between the lines 210 and 220 and thus between the pump 20 and the column 30, while the first sample reservoir 310 is coupled to line 200 and may thus be filled with the portion of sample via line 200.

Moving between the states of FIG. 3D and FIG. 3E as well as controlling the time period of such dilution state like in the FIG. 3D allows control over dilution of the content of the second sample reservoir with the mobile phase while transfer into the line 220 and further downstream the flow path towards the separation unit 30. It goes without saying that such dilution will only occur until the sample fluid content stored in the second sample reservoir 320 has been completely displaced out of the second sample reservoir 320 (or at least as long as sample fluid content stored in the second sample reservoir 320 is being moved therefrom).

The sequence of states 3A to 3E may represent the part of a switching or dispatching cycle corresponding to switching from the state of filling the second sample reservoir 320 and transferring the content of the first sample reservoir 310 into the line 220 towards the state of filling the first sample reservoir 310 and transferring the content of the second sample reservoir 320 into the line 220. The other part of the switching cycle comprising switching from the state 3E to the state 3A is symmetrical to the aforedescribed part of the switching cycle in respect to the role of the first and second sample reservoirs 310, 320.

It is clear that the valve 300 may be operated to sequentially move between the states 3A to 3E and then return by moving between the states 3E to 3A, and so on. However, any other sequence of operation may be applied accordingly dependent on the specific application.

In the embodiment of FIG. 3, the intermediate state of FIG. 3C to "safeguard" the column 30 (but also the whole system) from pressure variations may preferably be applied only for a short term because in such state the flow 200 (e.g. from the first dimension) is blocked.

FIGS. 4A-4E show an embodiment of the valve 300 as a rotational valve. Rotational valves are readily known in the art and need not to be explained in detail here. The valve 300 of FIG. 4, which may be a rotational valve, comprises a stator element with a plurality of terminals or ports (indicated as circles in FIG. 4) 400A-400N, and a rotor element comprising a plurality of flow couplers, which are embodied here as grooves 410A-410D. The grooves 410A-410C here are circular segment grooves which are circular segments (here arranged in two different diameters) of the valve 300, the radial groove 410 is configured to couple between the central terminal 400A and respective terminals 400B and 400F placed in the inner circle of the valve 300. Groove 410C is also arranged along this inner circle to couple the respective ports thereof. Accordingly, grooves 410A and 410B are arranged along an outer circle of the valve 300 for respectively coupling the terminals situated in this outer circle, namely terminals 400C, 400D, 400G, 400H, 400M and 400L.

Figure 4A:
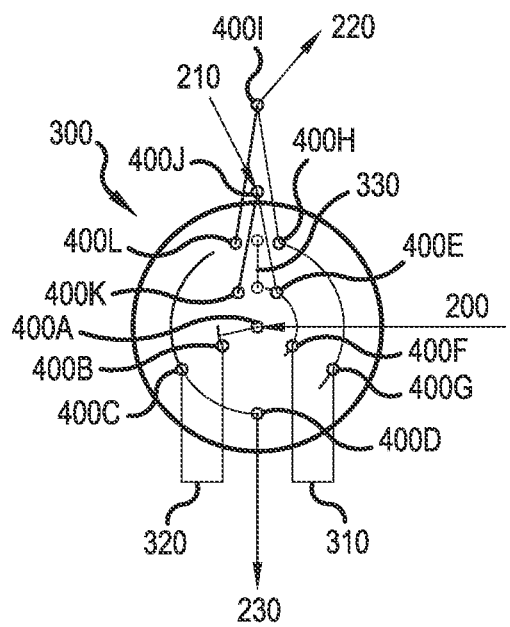
FIGS. 4A-4E show an embodiment of the valve 300 as a rotational valve.
Figure 4B:
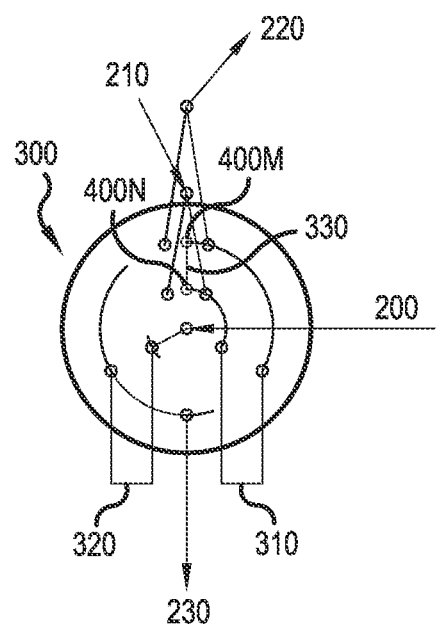
Figure 4C:
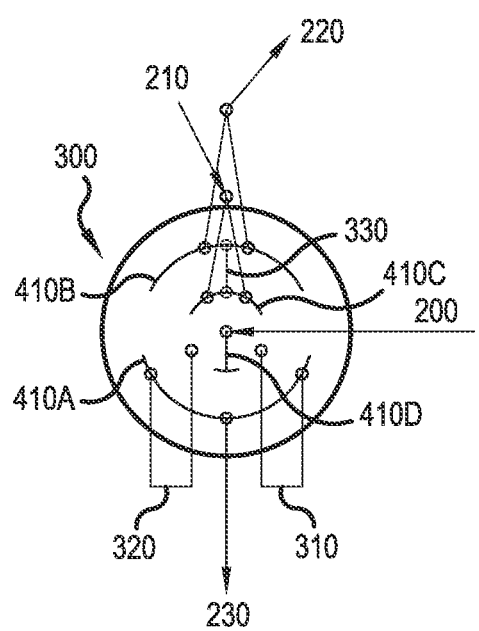
Figure 4D:
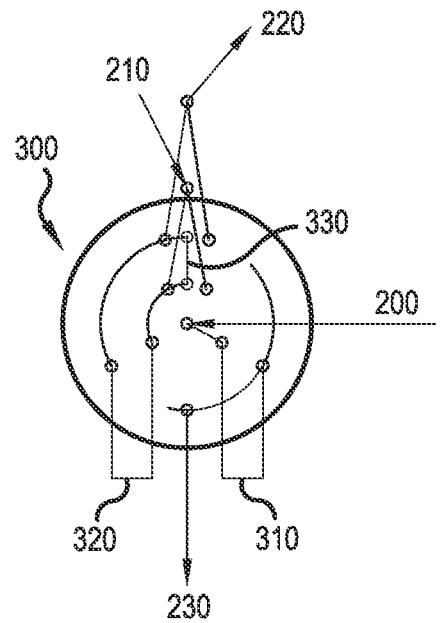
Figure 4E:
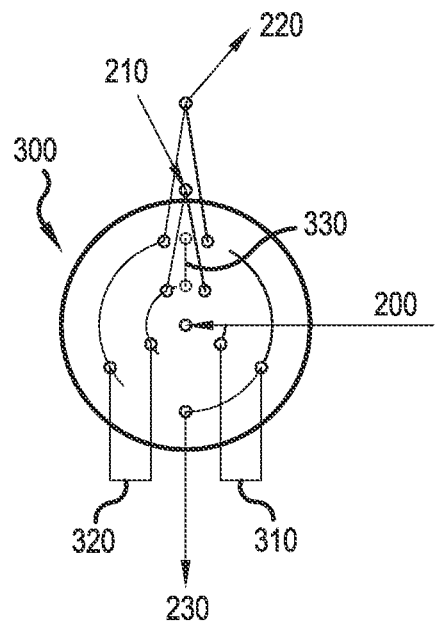

The states of operation in FIG. 3 and FIG. 4 substantially match, so that FIGS. 3A and 4A show the same functional state, FIGS. 3B and 4B show the same functional state, etc. Accordingly, the aforesaid with respect to FIG. 3 applies accordingly, mutatis mutandis, to FIG. 4 and need not be repeated. Additionally, the respective fluid flows are also indicated by arrows in FIG. 4. In the representation in FIG. 4 the bypass channel 330 is represented as part of the stator structure. However, it goes without saying that it can either be outlaid via the corresponding ports and thus can be adjusted e.g. by coupling different connection tubings between that ports represented as circles at the ends of the bypass channel 330.

FIGS. 5A-5L illustrate another embodiment of a valve 300, which may be a rotational valve. This embodiment has grooves situated in three different radiuses. In this embodiment external and internal implementation of bypass channel is possible. Pressure relief from the pressurized sample reservoir is prioritized, i.e. is arranged to be accomplished before the corresponding reservoir gets connected to the line 210. The bypass channel 330 is provided here by two channels 330A and 330B.

Figure 5A:
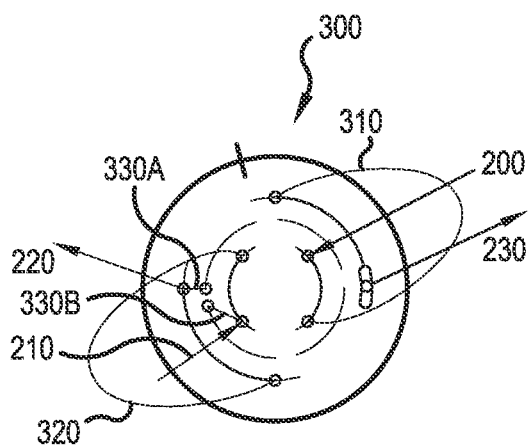
FIGS. 5A-5L illustrate another embodiment of a rotational valve 300.
Figure 5B:
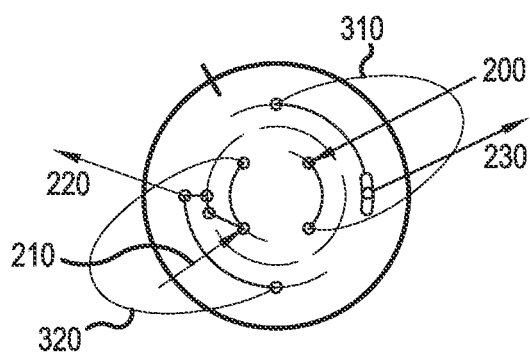
Figure 5C:
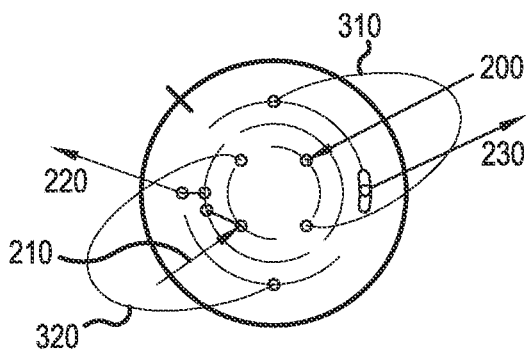
Figure 5D:
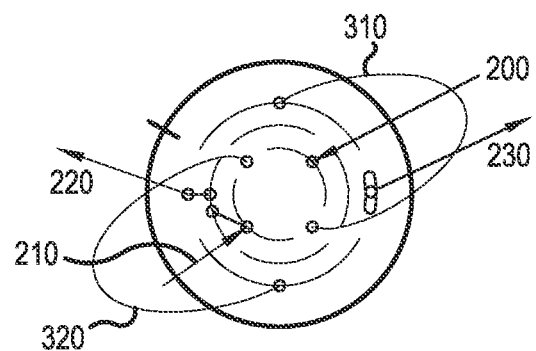
Figure 5E:
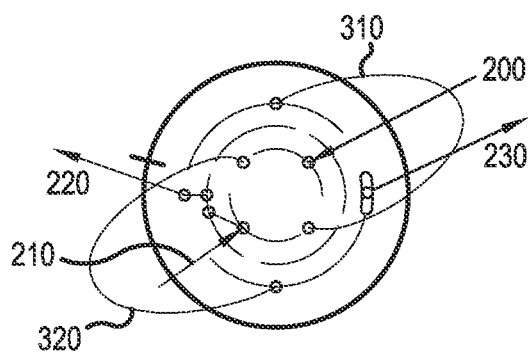
Figure 5F:
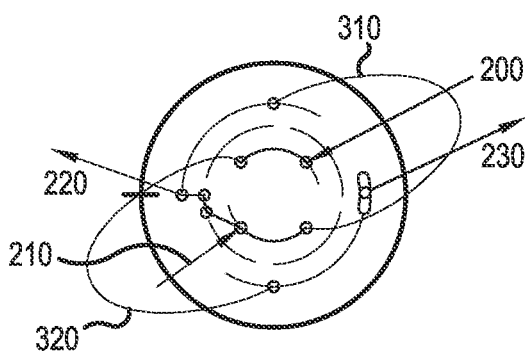
Figure 5G:
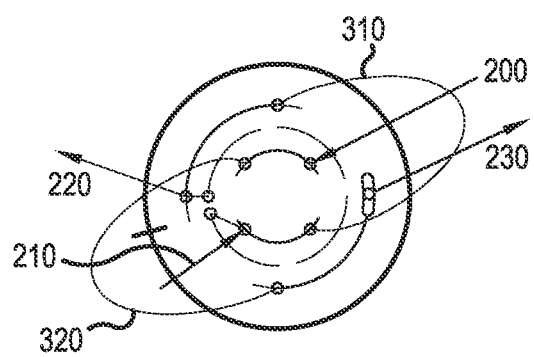
Figure 5H:
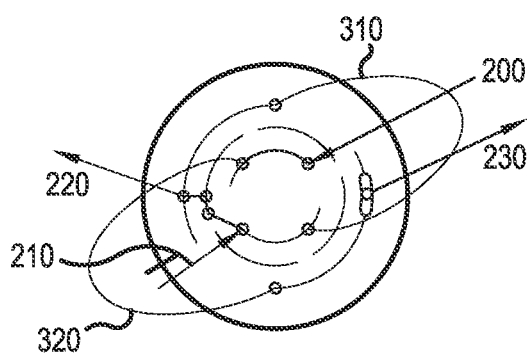
Figure 5I:
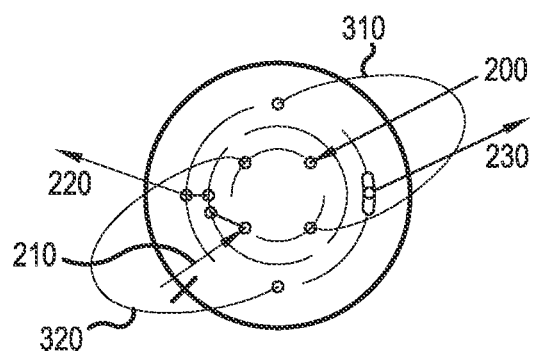
Figure 5J:
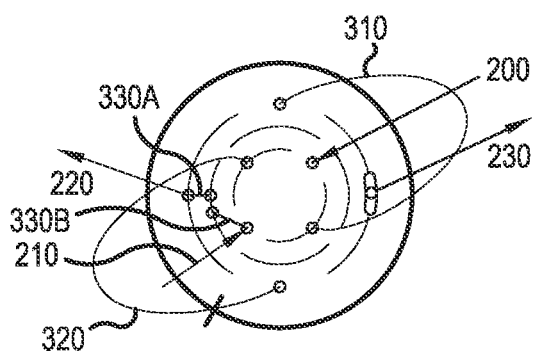
Figure 5K:
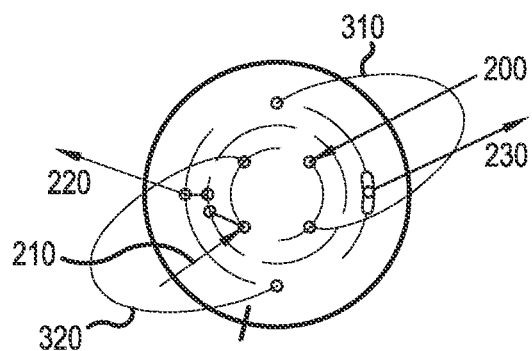
Figure 5L:
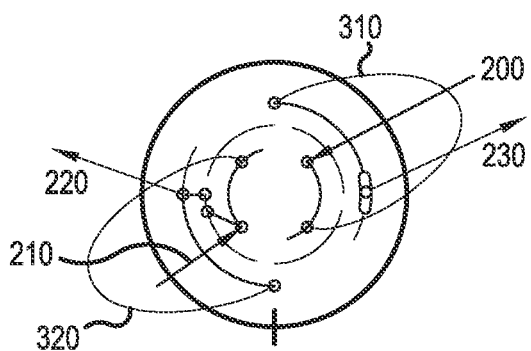

The FIG. 5 represent sequential rotational states of one of the possible embodiments of such modulation valve, which correspond to those described in the FIG. 3 in function, namely FIG. 5A corresponds in function to FIG. 3A, FIG. 5B to FIG. 3B, FIG. 5C, 5D, and 5E to FIG. 3C, FIG. 5F to FIG. 3D, FIG. 5G to FIG. 3E. FIG. 5H, 5I, 5J, 5K, and 5L correspond to the other, functionally symmetrical, part of the switching cycle as already explained above on example of FIG. 3.

The specific design of the valve represented in the FIG. 5 provides the described sequence of the switching states not only by "oscillating" the rotor like e.g. in the case of the FIG. 4, but also by rotation of the rotor in one direction, which might be advantageous for the valve motion control as well as its longevity.

It is clear that the line 210 providing the sample might generally originate from diverse sources, such as a previous dimension separation (e.g. LC, CE, centrifugation), process liquid supply, sewage control line etc.

First and second sample reservoirs 310, 320 may have additional superimposed functions, e.g. be implemented as trapping columns, SPE cartridges, chemical reactors.

The corresponding sample dispatcher 40 embodiments might comprise not only two but three or even more sample reservoirs operated in a manner as described above or similar, with at least one being operated for sample transfer and at least one sample reservoir being filled in any of the non-transition states.

The above examples of FIGS. 3-5 have been shown for the sake of better understanding with the first and second sample reservoirs 310, 320 only. However, it is clear that the same principles apply, mutatis mutandis, in case of only one sample reservoir as well as in case of three or more sample reservoirs.

We claim:

1. A sample dispatcher configured for individually introducing a plurality of portions of a sample fluid into a flow of a mobile phase of a separation system configured for separating compounds of one or more sample fluids, wherein the separation system comprises a mobile phase drive configured for driving the mobile phase through a separation unit configured for separating compounds of the sample fluid in the mobile phase, the sample dispatcher comprising:

a valve comprising an input and an output, the output coupled to the separation unit;

a sample reservoir coupled between the input and the output; and a bypass channel coupling the input of the valve to the output of the valve, wherein:

the sample dispatcher is configured to selectively switch the valve to a loading state and a dilution state;

at the loading state, the valve defines a flow path into the sample reservoir, wherein the sample reservoir receives and temporarily stores at least one portion of the plurality of portions of the sample fluid;

at the dilution state, the valve fluidly couples the sample reservoir and the bypass channel in respective parallel flow paths between the mobile phase drive and the separation unit, the parallel flow paths joining at a point upstream of the separation unit, wherein:

the mobile phase is driven through the sample reservoir and the bypass channel via the parallel flow paths; and the at least one portion of the plurality of portions of the sample fluid is driven with the mobile phase from the sample reservoir to the separation unit, and is diluted by the mobile phase from the bypass channel; and wherein switching states of the valve comprise a) a first switching state which fluidly couples only the sample reservoir between the mobile phase drive and the separation unit, b) a second switching state which fluidly couples both the sample reservoir and the bypass channel between the mobile phase drive and the separation unit, and c) a third switching state which fluidly couples only the bypass channel between the mobile phase drive and the separation unit.

2. The sample dispatcher of claim 1, wherein the sample dispatcher is configured for coupling the bypass channel between the mobile phase drive and the separation unit at least during an intermediate state of the sample dispatcher at which the sample reservoir is not coupled between the mobile phase drive and the separation unit.

3. The sample dispatcher of claim 1, wherein the sample dispatcher is configured to selectively switch the valve to a sample reservoir state, at which the sample reservoir is coupled between the mobile phase drive and the separation unit while the bypass channel is not coupled between the mobile phase drive and the separation unit.

4. The sample dispatcher of claim 1, comprising a feature selected from the group consisting of:

the bypass channel is configured to have about 50% or less volume than the sample reservoir;

the bypass channel is configured to be exchangeable or adjustable in its flow restrictivity, by adjusting a flow ratio between a flow through the sample reservoir and a flow through the bypass channel;

the sample dispatcher is configured to switch the valve such that at any point in time at least one of the sample reservoir, an additional sample reservoir of the sample dispatcher, or the bypass channel is coupled between the mobile phase drive and the separation unit;

the sample reservoir is a first sample reservoir configured for receiving and temporarily storing a first sample fluid portion of the plurality of portions of the sample fluid, and the sample dispatcher further comprises a second sample reservoir configured for receiving and temporarily storing a second sample fluid portion of the plurality of portions of the sample fluid; and a combination of two or more of the foregoing.

5. A liquid separation system for separating sample fluid compounds, the liquid separation system comprising:

the mobile phase drive of claim 1;
the separation unit of claim 1;
a sample providing apparatus configured to provide the sample fluid; and
the sample dispatcher of claim 1 fluidly coupled to the mobile phase drive and to the sample providing apparatus, and configured to receive the sample fluid from the sample providing apparatus.

6. The liquid separation system of claim 5, further comprising a feature selected from the group consisting of:

a detector configured to detect separated compounds of the sample fluid;
a collection unit configured to collect separated compounds of the sample fluid;
a data processing unit configured to process data received from the liquid separation system;
a degasser for degassing the mobile phase; and
a combination of two or more of the foregoing.

7. The liquid separation system of claim 5, wherein the mobile phase drive is a first mobile phase drive, the mobile phase is a first mobile phase, and the separation unit is a first separation unit, and the sample providing apparatus comprises:

a second separation unit fluidly coupled to the sample dispatcher, and configured to separate compounds of the sample fluid in a second mobile phase; and
a second mobile phase drive configured to drive the second mobile phase through the second separation unit,
wherein at least a portion of the separated compounds are provided to the sample dispatcher as the plurality of portions of the sample fluid.

8. The liquid separation system of claim 5, comprising a controller configured to control switching the valve to the loading state and the dilution state.

9. The sample dispatcher of claim 1, comprising a controller configured to control switching the valve to the loading state and the dilution state.

10. The sample dispatcher of claim 1, wherein:

the sample reservoir is a second sample reservoir, and the sample dispatcher further comprises a first reservoir;
at the dilution state, the valve fluidly couples the second sample reservoir and the bypass channel in respective parallel flow paths between the mobile phase drive and the separation unit, and the at least one portion of the plurality of portions of the sample fluid is driven with the mobile phase from the second sample reservoir to the separation unit; and
at the dilution state, the valve defines a flow path into the first sample reservoir, wherein the first sample reservoir receives and temporarily stores at least one other portion of the plurality of portions of the sample fluid.

11. A liquid separation system for separating sample fluid compounds, the liquid separation system comprising:

a separation unit configured to separate compounds of a sample fluid in a mobile phase;
a mobile phase drive configured to drive the mobile phase through the separation unit;
a sample providing apparatus configured to provide the sample fluid;
a sample dispatcher configured to receive the sample fluid from the sample providing apparatus, and configured to introduce a plurality of portions of the sample fluid into the mobile phase, the sample dispatcher comprising:

a valve comprising an input and an output, the output coupled to the separation unit, and the valve configured to be switched to a loading state and to a dilution state;
a sample reservoir coupled between the input and the output; and
a bypass channel coupling the input of the valve to the output of the valve; and a controller configured to:
switch the valve to the loading state, at which the sample reservoir is fluidly coupled to the sample providing apparatus and receives at least one portion of the plurality of portions of the sample fluid;

switch the valve to the dilution state, at which the sample reservoir and the bypass channel are fluidly coupled in parallel flow paths between the mobile phase drive and the separation unit, and the parallel flow paths join at a point upstream of the separation unit, wherein:
- the mobile phase is driven through the sample reservoir and the bypass channel via the parallel flow paths; and
- the at least one portion of the plurality of portions of the sample fluid is driven with the mobile phase from the sample reservoir to the separation unit, and is diluted by the mobile phase from the bypass channel, and wherein switching states of the valve comprise a) a first switching state which fluidly couples only the sample reservoir between the mobile phase drive and the separation unit, b) a second switching state which fluidly couples both the sample reservoir and the bypass channel between the mobile phase drive and the separation unit, and c) a third switching state which fluidly couples only the bypass channel between the mobile phase drive and the separation unit.

12. The liquid separation system of claim 11, wherein:
the valve is configured to be switched to a sample reservoir state, at which the sample reservoir is fluidly coupled between the mobile phase drive and the separation unit while the bypass channel is not fluidly coupled between the mobile phase drive and the separation unit; and
while the valve is in the sample reservoir state, the at least one portion of the plurality of portions of the sample fluid is driven with the mobile phase from the sample reservoir to the separation unit without being diluted.

13. The liquid separation system of claim 11, wherein:
the sample reservoir is a second sample reservoir, and the sample dispatcher further comprises a first reservoir;
at the dilution state, the valve fluidly couples the second sample reservoir and the bypass channel in respective parallel flow paths between the mobile phase drive and the separation unit, and the at least one portion of the plurality of portions of the sample fluid is driven with the mobile phase from the second sample reservoir to the separation unit; and
at the dilution state, the valve defines a flow path into the first sample reservoir, wherein the first sample reservoir receives and temporarily stores at least one other portion of the plurality of portions of the sample fluid.

14. A sample dispatcher configured for individually introducing a plurality of portions of a sample fluid into a flow of a mobile phase of a separation system configured for separating compounds of one or more sample fluids, wherein the separation system comprises a mobile phase drive configured for driving the mobile phase through a separation unit configured for separating compounds of the sample fluid in the mobile phase, the sample dispatcher comprising:
- a valve comprising at least an input and an output, the output coupled to the separation unit;
- a sample reservoir coupled between the input and the output;
- a bypass channel coupling the input of the valve to the output of the valve,
and the valve is switchable to a state such that the bypass channel is not coupled between the mobile phase drive and the separation unit, wherein:
  - the sample dispatcher is configured to selectively switch the valve to a loading state and a dilution state;
  - at the loading state, the valve defines a flow path into the sample reservoir, wherein the sample reservoir receives and temporarily stores at least one portion of the plurality of portions of the sample fluid;
  - at the dilution state, the valve fluidly couples the sample reservoir and the bypass channel in respective parallel flow paths between the mobile phase drive and the separation unit, the parallel flow paths joining at a point upstream of the separation unit, wherein:
    - the mobile phase is driven through the sample reservoir and the bypass channel via the parallel flow paths; and
    - the at least one portion of the plurality of portions of the sample fluid is driven with the mobile phase from the sample reservoir to the separation unit, and is diluted by the mobile phase from the bypass channel; and
  - wherein switching states of the valve comprise a) a first switching state which fluidly couples only the sample reservoir between the mobile phase drive and the separation unit, b) a second switching state which fluidly couples both the sample reservoir and the bypass channel between the mobile phase drive and the separation unit, and c) a third switching state which fluidly couples only the bypass channel between the mobile phase drive and the separation unit.

* * * * *